United States Patent
Kim et al.

(10) Patent No.: US 12,340,476 B2
(45) Date of Patent: Jun. 24, 2025

(54) METHOD OF LEARNING A TARGET OBJECT BY DETECTING AN EDGE FROM A DIGITAL MODEL OF THE TARGET OBJECT AND SETTING SAMPLE POINTS, AND METHOD OF AUGMENTING A VIRTUAL MODEL ON A REAL OBJECT IMPLEMENTING THE TARGET OBJECT USING THE LEARNING METHOD

(71) Applicant: VIRNECT inc., Seoul (KR)

(72) Inventors: Ki Young Kim, Seoul (KR); Thorsten Korpitsch, Schwechat Vienna (AT)

(73) Assignee: VIRNECT INC., Seoul (KR)

( * ) Notice: Subject to any disclaimer, the term of this patent is extended or adjusted under 35 U.S.C. 154(b) by 81 days.

(21) Appl. No.: 18/146,805

(22) Filed: Dec. 27, 2022

(65) Prior Publication Data

US 2023/0206573 A1 Jun. 29, 2023

(30) Foreign Application Priority Data

Dec. 29, 2021 (KR) .................. 10-2021-0191596

(51) Int. Cl.
*G06T 19/00* (2011.01)
*G06V 10/46* (2022.01)
(Continued)

(52) U.S. Cl.
CPC .......... *G06T 19/006* (2013.01); *G06V 10/764* (2022.01); *G06V 2201/07* (2022.01)

(58) Field of Classification Search
CPC ......... G06T 19/00; G06T 17/00; G06T 15/10; G06F 18/22–23; G06F 18/214;
(Continued)

(56) References Cited

U.S. PATENT DOCUMENTS 9,508,021 B2 * 11/2016 van Zwol ............ G06V 10/757
10,769,411 B2 * 9/2020 Grabner .................. G06T 19/20
(Continued)

FOREIGN PATENT DOCUMENTS

CN 108038761 A 5/2018
CN 110559075 A 12/2019
(Continued)

OTHER PUBLICATIONS

The extended European search report of EP 22 21 6136, Jul. 26, 2023.
(Continued)

*Primary Examiner* — Wesner Sajous
(74) *Attorney, Agent, or Firm* — STIP Law Group, LLC

(57) ABSTRACT

A method of learning a target object by detecting an edge from a digital model of the target object and setting a sample point according to one embodiment of the present disclosure, which is performed by a computer-aided design program of an authoring computing device, includes: displaying a digital model of a target object that is a target of image recognition; detecting edges on the digital model of the target object; classifying the detected edges according to a plurality of characteristics; obtaining sample point information on the detected edges; and generating object recognition library data for recognizing a real object implementing the digital model of the target object based on the detected edges, characteristic information of the detected edges, and the sample point information.

9 Claims, 12 Drawing Sheets

(51) Int. Cl.
*G06V 10/764* (2022.01)
*G06V 10/82* (2022.01)

(58) Field of Classification Search
CPC .............. G06F 18/2148; G06V 10/764; G06V 10/761; G06V 10/82; G06V 10/774; G06V 2201/07; G06N 3/045–047; G06N 3/084; G06N 3/088; G06N 5/02
See application file for complete search history.

(56) References Cited

U.S. PATENT DOCUMENTS

| | | | |
|---|---|---|---|
| 2008/0208547 A1* | 8/2008 | Kim | G06T 7/536 703/2 |
| 2015/0212343 A1* | 7/2015 | Fonte | A61B 3/111 700/98 |
| 2016/0171768 A1 | 6/2016 | Park et al. | |
| 2017/0076174 A1* | 3/2017 | Song | G06F 16/5838 |
| 2023/0032036 A1* | 2/2023 | Wang | G06T 19/20 |

FOREIGN PATENT DOCUMENTS

| | | |
|---|---|---|
| CN | 112367514 A | 2/2021 |
| KR | 20210108897 A | 9/2021 |

OTHER PUBLICATIONS

The partial European search report of 22216136.6, Apr. 25, 2023.
Philip Kinsella, Analysis and Design of In-ear Devices, Swinburne University of Technology Doctoral Thesis, Oct. 23, 2018, Hawthorn, Australia.

* cited by examiner

METHOD OF LEARNING A TARGET OBJECT BY DETECTING AN EDGE FROM A DIGITAL MODEL OF THE TARGET OBJECT AND SETTING SAMPLE POINTS, AND METHOD OF AUGMENTING A VIRTUAL MODEL ON A REAL OBJECT IMPLEMENTING THE TARGET OBJECT USING THE LEARNING METHOD

CROSS-REFERENCE TO RELATED APPLICATIONS

This application claims the benefit of Koran Patent Application No. 10-2021-0191596, filed on Dec. 29, 2021, in the Korean Intellectual Property Office, the entire disclosure of which is incorporated herein by reference for all purposes.

TECHNICAL FIELD

The present disclosure relates to a method of learning a target object by detecting an edge from a digital model of the target object and setting sample points, and a method of augmenting a virtual model on a real object implementing the target object using the learning method.

BACKGROUND

Augmented reality is a visualization technology that can intuitively visualize 3D model information by matching a 3D model to a real image. However, in order to estimate the pose of the real model from the viewpoint of an engineer, already known reference information on the image is required. To this end, in the past, a method of making a database of the appearance of the real model when viewed from various angles and comparing it with the input image, or a method of inputting the initial pose into a system by a user and tracking markers has been used. However, it is difficult to apply this method to products in production, and it has the disadvantage of requiring a lot of time and effort for the user to define the initial pose and the limitation that a marker is required, so that the application to commercialization and industry is limited. Markerless base is more general than the case of using a marker and has a wider application field, research on markerless augmented reality is active in recent years. The markerless tracking technology, which was introduced to compensate for the disadvantages of marker-based augmented reality, literally does not use markers, but is characterized by being able to use graphic information such as general magazines and posters or feature information of real objects as they are. The markerless tracking technology requires a high degree of recognition technology and uses a method of recognizing an object and providing additional information related to the object. However, even in the case of markerless, when environmental information such as brightness or the shape or position of various objects on the background changes, there is a problem in that accuracy of matching extraction is deteriorated. A method of improving matching accuracy using deep learning has been proposed to improve accuracy, but there is still a limitation in that considerable effort and time are required to extract feature information from various and complex real world or objects in the real world. In addition, in order to utilize augmented reality technology in the medical field or precision industry that requires a very high level of accuracy in tracking and recognizing real objects and matching between real objects and augmented models, or to increase the degree of immersion in augmented reality, it is required to quickly and accurately detect feature information of an object.

SUMMARY

In view of the above, the present disclosure provides a method for solving problems such as delay of learning a real object or cost caused by a decrease in accuracy due to various environmental factors and requirement of high-level vision technology in learning a real object.

In addition, the present disclosure provides a method of learning a real object without requiring repeated manufacturing of a real model for learning a new real object or a partially changed object.

Further, the present disclosure provides a method of learning a digital model of a target object on a computer-aided design program to accurately and quickly learn feature information of a real object.

Furthermore, the present disclosure provides a method for enabling fast detection and accurate tracking of a pose of a real object using characteristic information of edges.

Moreover, the present disclosure provides a method of learning a digital model of a target object on a computer-aided design program, which improves the exquisiteness of content augmentation by increasing the accuracy of tracking and recognizing the real object.

In accordance with one embodiment of the present disclosure, there is provided a method of learning a target object by detecting an edge from a digital model of the target object and setting a sample point, which is performed by a computer-aided design program of an authoring computing device, the method comprising: displaying a digital model of a target object that is a target of image recognition; detecting edges on the digital model of the target object; classifying the detected edges according to a plurality of characteristics; obtaining sample point information on the detected edges; and generating object recognition library data for recognizing a real object implementing the digital model of the target object based on the detected edges, characteristic information of the detected edges, and the sample point information.

The classifying of the detected edges according to the plurality of characteristics may include: classifying the detected edges into a sharp edge, a dull edge, and a flat edge based on information on angles formed by normal vectors of faces including components of the digital model of the target object.

An angle between the normal vectors of the faces forming the sharp edge may have a first angle range, an angle between the normal vectors of the faces forming the dull edge may have a second angle range having a maximum angle smaller than a minimum angle within the first angle range, and an angle between the normal vectors of the faces forming the flat edge has a third angle range having a maximum angle smaller than a minimum angle within the second angle range.

The obtaining of the sample point information on the detected edges may include detecting a midpoint of each of the detected edges, and detecting sample points along the edges from the midpoints.

The learning method may further comprise classifying and visualizing the detected edges according to characteristics by superimposing the detected edges on the digital model of the target object, wherein the classifying and visualizing of the detected edges according to characteristics includes updating visualization of the detected edges on the digital model of the target object in response to a change of a position of the digital model of the target object.

The classifying and visualizing of the detected edges according to characteristics may include, in synchronization with a design change of a partial area of the digital model of the target object, modifying and displaying an edge on the design-changed area.

The learning method may further comprise generating augmented content, matching and storing the augmented content with the digital model of the target object.

In accordance with another embodiment of the present disclosure, there is provided a method of augmenting a virtual model to a real object implementing a target object learned by detecting edge characteristics and setting sample points, which is performed by an augmented reality program of a terminal including a camera, the method comprising: receiving and storing the object recognition library data described above; capturing an image by photographing surrounding environment; detecting a real object that is matched with the stored object recognition library data in the captured image; and matching and displaying augmented content to the detected real object.

The detecting of a real object matched with the stored object recognition library data in the captured image may include detecting a real object in the captured image based on characteristic information of edges detected on a digital model of the target object and a sample point of each edge.

The augmenting method may further comprise detecting and tracking a pose of the real object by detecting a dull edge of the real object in the captured image.

According to the embodiment of the present disclosure, it is possible to efficiently learn the feature information of a real object, and improve the exquisiteness of content augmentation by increasing the accuracy of tracking and recognizing the real object.

Further, according to the embodiment of the present disclosure, it is possible to provide the method of learning a digital model of a target object using characteristic information of edges.

In addition, according to the embodiment of the present disclosure, it is possible to quickly detect uniformly distributed sample points in any type of manifold computer-aided design model.

Furthermore, according to the embodiment of the present disclosure, it is possible to provide the method of detecting sample points which are very efficient for detecting and tracking a real object In addition, according to the embodiment of the present disclosure, by using sample points as object feature information, digital model learning, and real-time object detection and tracking can be performed very efficiently even in a low-cost device requiring low computational complexity.

Further, according to the embodiment of the present disclosure, by uniformly distributing and setting the sample points on an object being tracked and detected, the update of the change in the pose of the object can be well controlled, and the phenomenon that the position of the object is detected after jumping to another position can be prevented.

In addition, according to the embodiment of the present disclosure, at the stage of designing a real object before its production, the real object can be learned for augmented reality implementation.

Further, according to the embodiment of the present disclosure, it is possible to generate learning data of a target object having robust characteristics of recognition for various poses of a real object.

Furthermore, according to the embodiment of the present disclosure, the edges of the digital model can be visualized by classifying them according to characteristics, and by rendering the edges in real time according to the view of the digital model, the visual intuition of tracking and detecting the edges of the digital model can be improved.

In addition, the object recognition library data can be shared and used by various user computing devices through a cloud database, which increases the utilization of learning data for target objects.

DETAILED DESCRIPTION

Figure 1:
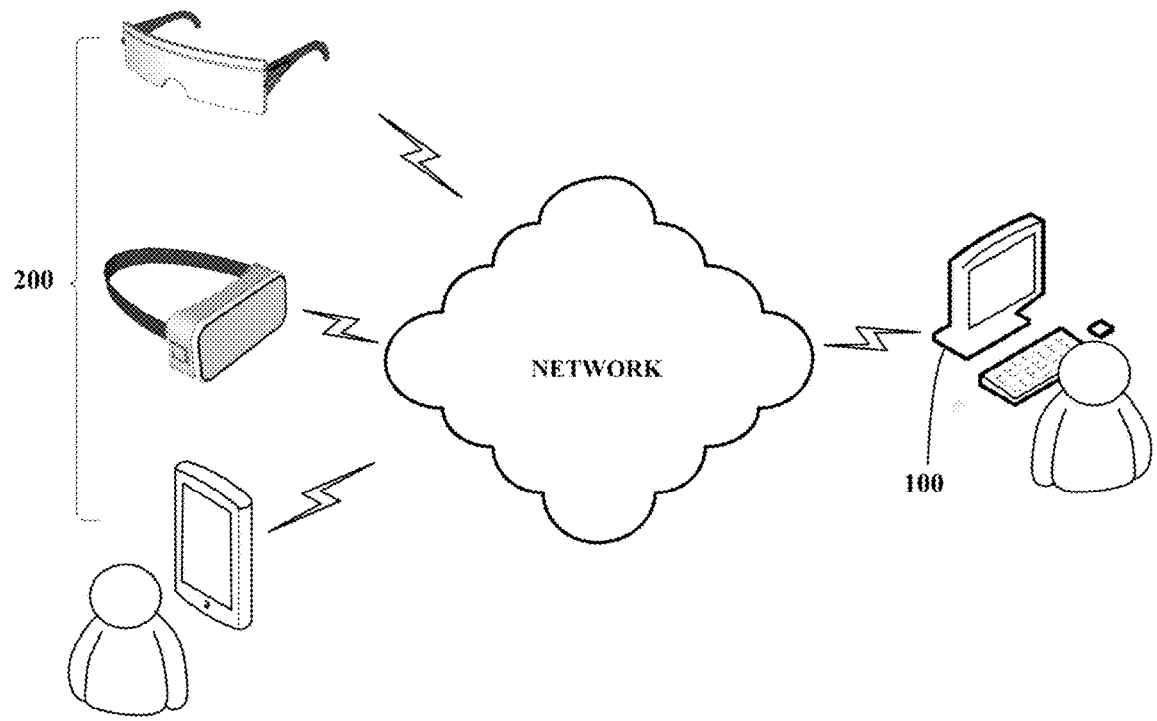
FIG. 1 is an exemplary block diagram of a system for implementing a method of augmenting a virtual model to a real object which implements a target object by learning the target object by detecting edges from a digital model of the target object and setting sample points.

Various modifications may be made to the present disclosure, and the present disclosure may have various embodiments, specific embodiments of the present disclosure will be illustrated in the drawings and described in detail in the detailed description. Effects and features of the present disclosure, and methods for achieving them will become clear with reference to the embodiments described later in detail together with the drawings. However, the present disclosure is not limited to the embodiments disclosed below and may be implemented in various forms. In the following embodiments, terms such as first and second are used for the purpose of distinguishing one component from another component rather than limiting meaning. Further, the singular expression include plural expressions unless the context clearly indicates otherwise. In addition, terms such as comprise, include or have mean that features or component described in the specification exist, and do not preclude the possibility that one or more other features or components may be added. Furthermore, in the drawings, the size of components may be exaggerated or reduced for convenience of description. For example, since the size and thickness of each component shown in the drawings are arbitrarily shown for convenience of explanation, the present disclosure is not necessarily limited to the illustration.

Hereinafter, embodiments of the present disclosure will be described in detail with reference to the accompanying drawings, and when described with reference to the drawings, the same or corresponding components are given the same reference numerals, and redundant descriptions thereof will be omitted.

Figure 2:
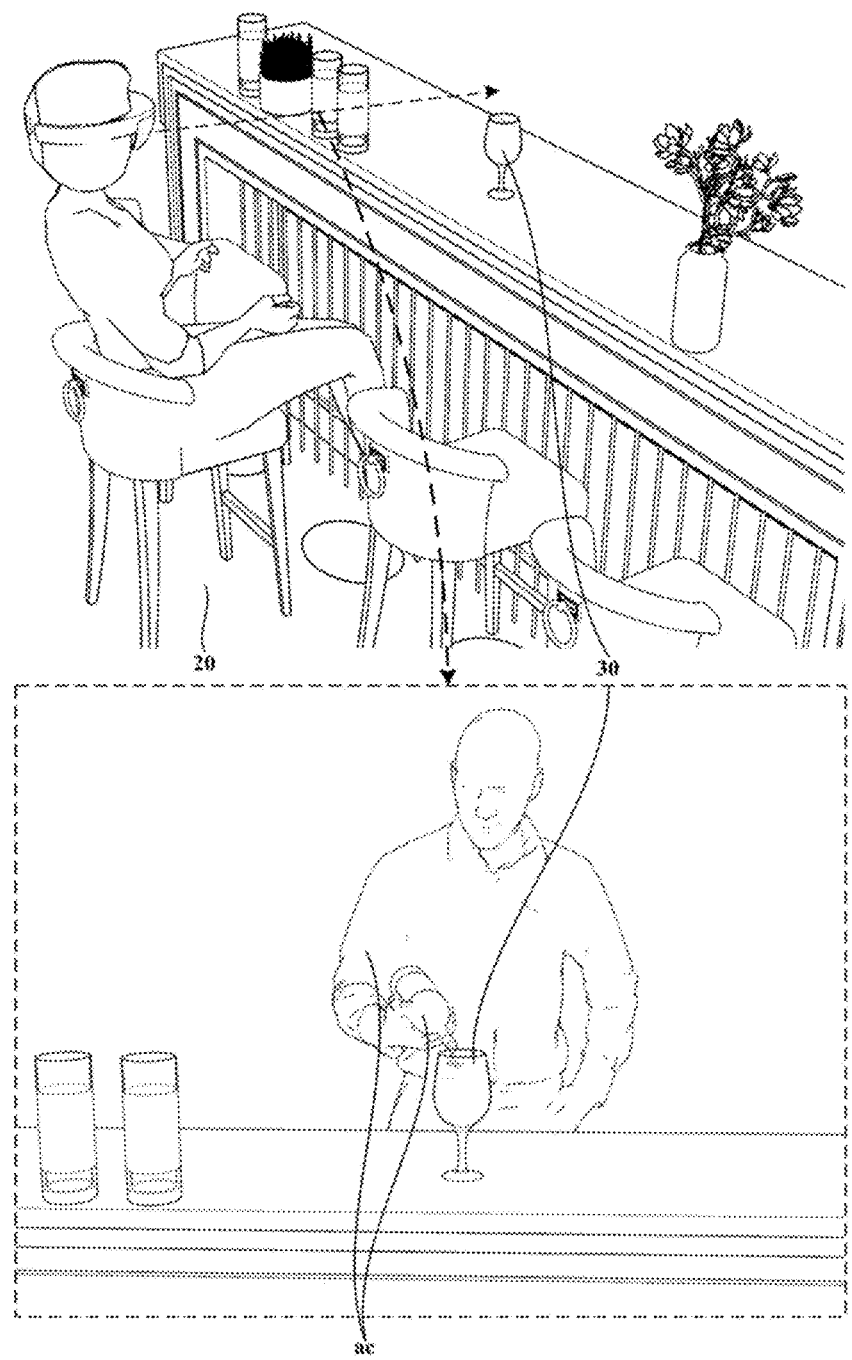
FIGS. 2 and 3 depict that a user computing device tracks and recognizes a real object in a real environment, and matches augmented content to the real object to display it on a screen, and a user checks the screen through the user computing device.
Figure 3:
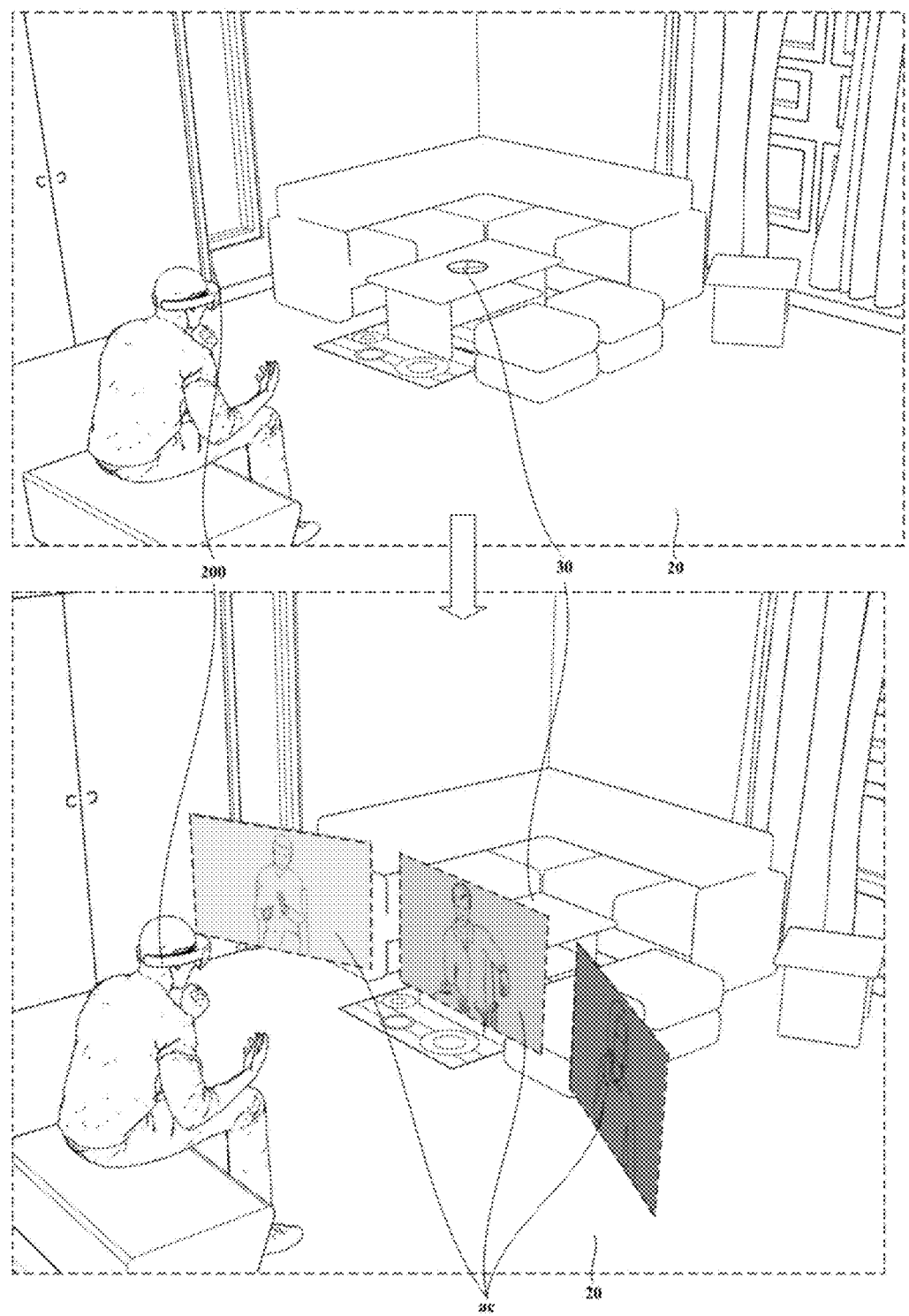
Figure 4:
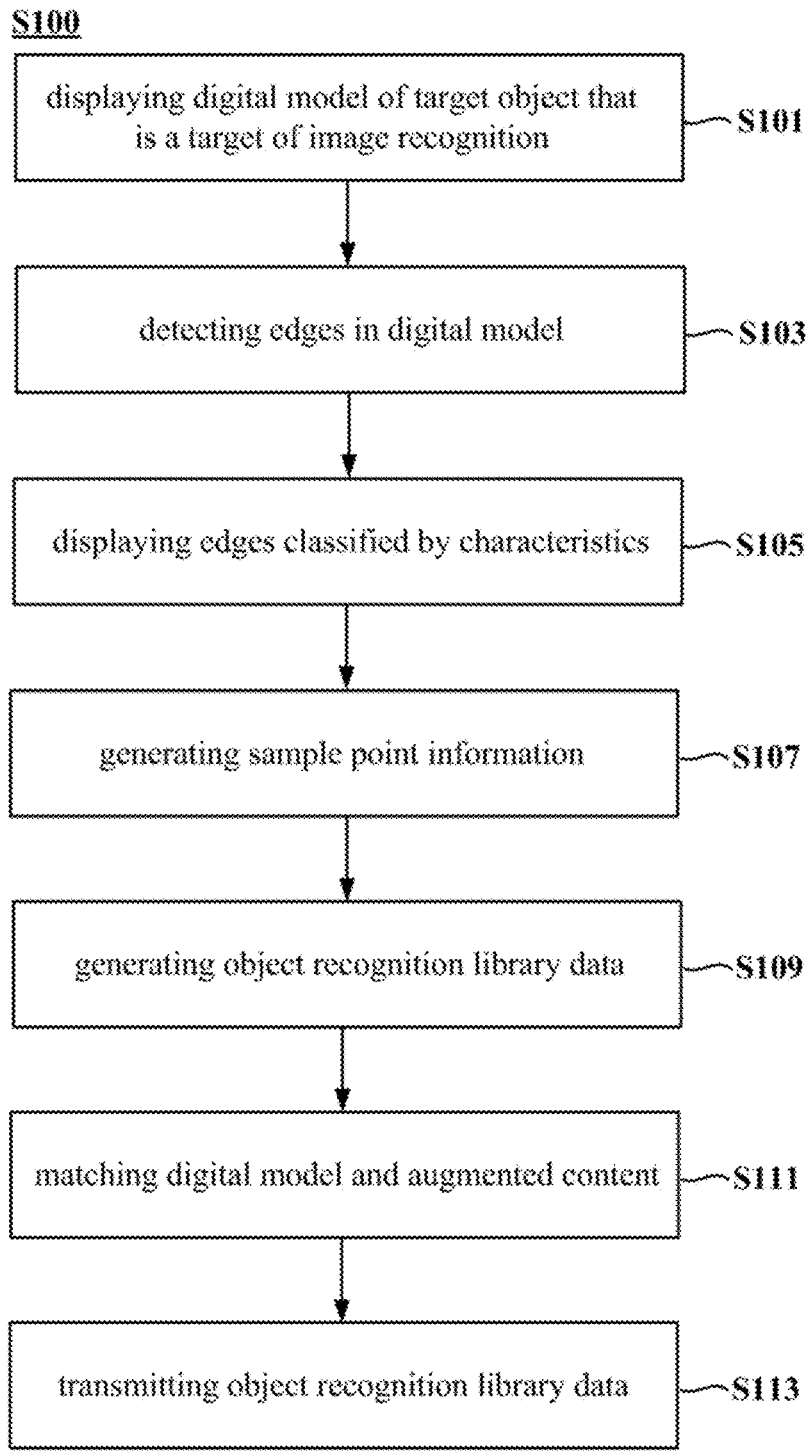
FIG. 4 is a flowchart of a method of learning a target object by detecting characteristics of edges from a digital model of the target object and setting sample points according to an embodiment of the present disclosure.

FIG. 1 is an exemplary block diagram of a system for implementing a method of augmenting a virtual model to a real object which implements a target object by learning the target object by detecting edges from a digital model of the target object and setting sample points. Further, FIGS. 2 and 3 depict that a user computing device tracks and recognizes a real object in a real environment, and matches augmented content to the real object to display it on a screen, and a user checks the screen through the user computing device. FIG. 4 is a flowchart of a method of learning a target object by detecting characteristics of edges from a digital model of the target object and setting sample points according to an embodiment of the present disclosure. FIGS. 5 to 12 schematically depict a user interface of a computer-aided design program running on an authoring computing device.

(System)

Referring to FIGS. 1 to 3, a system 10 according to one embodiment of the present disclosure may include an authoring computing device 100 and a user computing device 200.

The system 10 according to one embodiment of the present disclosure may learn a target object by detecting an edge from a digital model of the target object, and augment various contents (ac) to a real object 30 by tracking and recognizing the real object 30 in a real environment 20 using learned data.

The authoring computing device 100 provides an environment for learning the target object by detecting an edge from a digital model of the target object and setting a sample point. In addition, the authoring computing device 100 may provide an environment for creating drawings of 3D models of various objects and an environment for creating and editing contents such as various augmented models or various types of information for various objects. The authoring computing device 100 may provide various tools for drawing various contents, and may include mechanisms for importing existing files including images and 2D or 3D objects without being limited thereto.

Computer systems for augmented reality, referred to as user computing device 200 in one embodiment of the present disclosure, include electronic devices that create augmented reality environments. Embodiments of an electronic device, user interfaces for the electronic device, and associated processes for using the electronic device are described. In some embodiments, the user computing device 200 is a portable communication device, such as a mobile phone. Further, other portable electronic devices such as laptop or tablet computers having touch-sensitive surfaces (e.g., touch screen displays and/or touchpads) are optionally used. In some embodiments, the user computing device 200 may be a computer device that includes or communicates with one or more cameras, rather than a portable communication device. In addition, the user computing device 200 may include a head mounted display (HMD) that allows a user who wears the device and is immersed in an augmented and/or virtual reality environment to explore a virtual environment and interact with the virtual environment through various different types of inputs. In some embodiments, as the user computing device 200, a commercial product, such as a HoloLens of Microsoft, Meta1/Meta2 Glasses of Meta, Google Glass of Google, MD-10 of Canon, or Magic Leap One Creator Edition of Magic Leap, may be used, or a device providing the same or similar functions as those of the commercial product may be used.

(Computer-Aided Design Program)

A computer-aided design program 100*p* is installed on the authoring computing device 100.

Various software developer kits (SDKs) or toolkits in the form of libraries may be applied to the computer-aided design program 100*p*.

Figure 5:
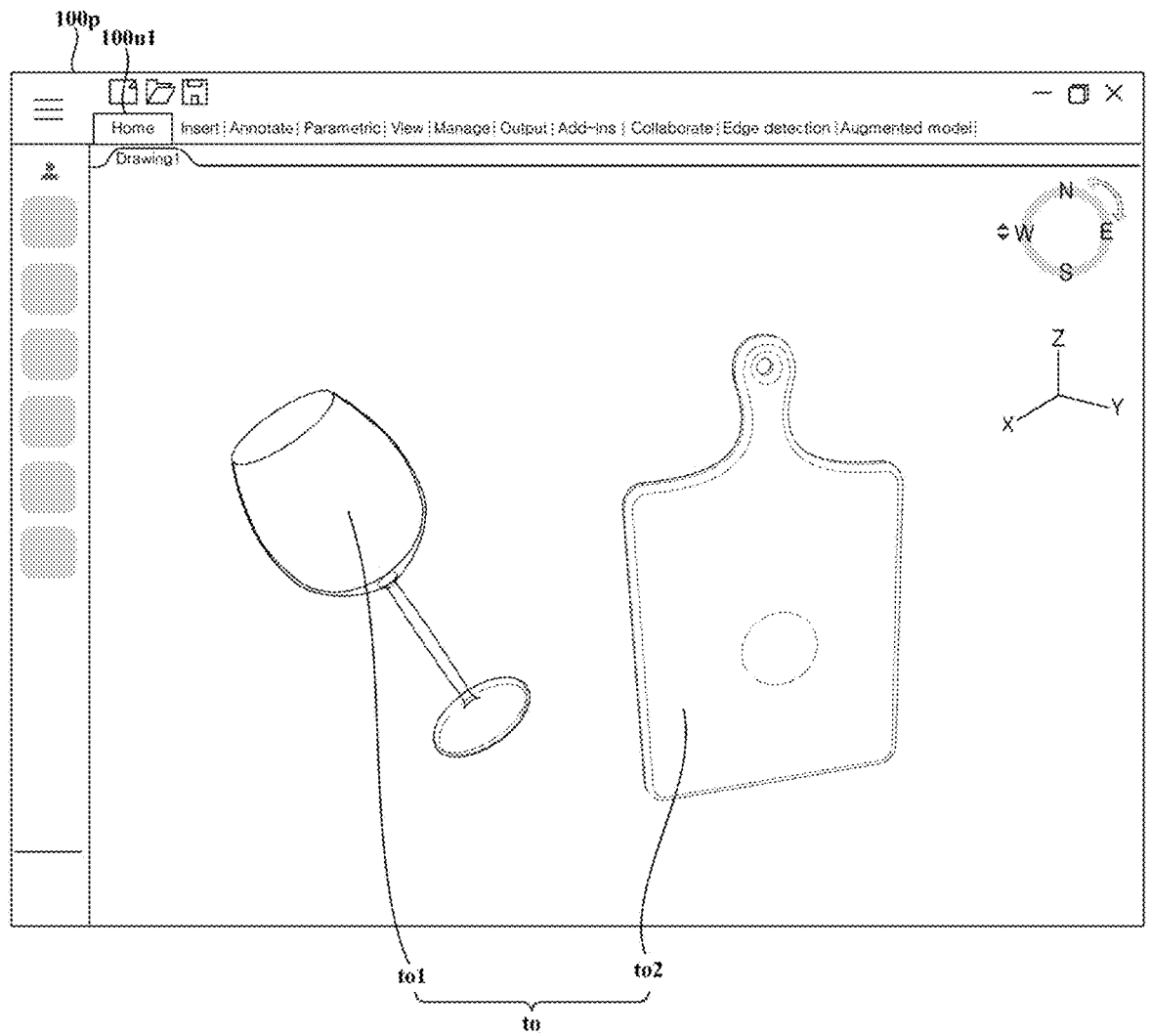
FIGS. 5 to 12 schematically depict a user interface of a computer-aided design program running on an authoring computing device.

As exemplarily shown in FIG. 5, the computer-aided design program 100*p* running on the authoring computing device 100 enables digital production of a 2D drawing and a 3D model of a real object 30 before manufacturing the real object 30. In addition, as exemplarily shown in FIGS. 5 and 6, the computer-aided design program 100*p* enables digital production of 3D model information or virtual information, which is content ac augmented on the real object 30. Further, the computer-aided design program 100*p* enables implementation of physical and visual combination between a digital model to of the target object corresponding to the real object 30 and the augmented content ac, and matching of the positions of the digital model to and the augmented content ac.

The computer-aided design program 100*p* may provide a target object modeling interface 100*u*1 for modeling the target object. A 2D drawing or 3D model of the digital model to of the target object may be created on the target object modeling interface 100*u*1.

Figure 6:
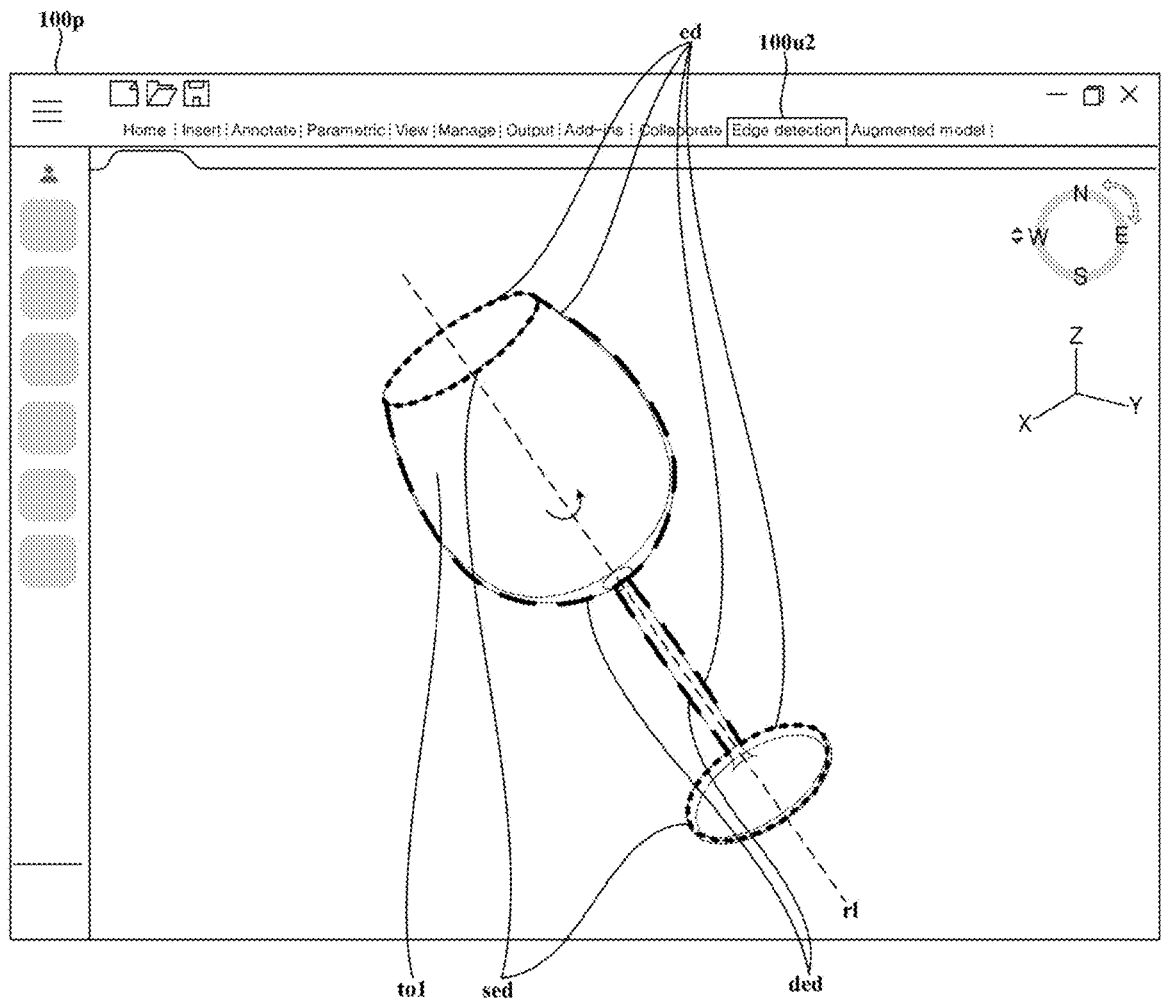
Figure 7:
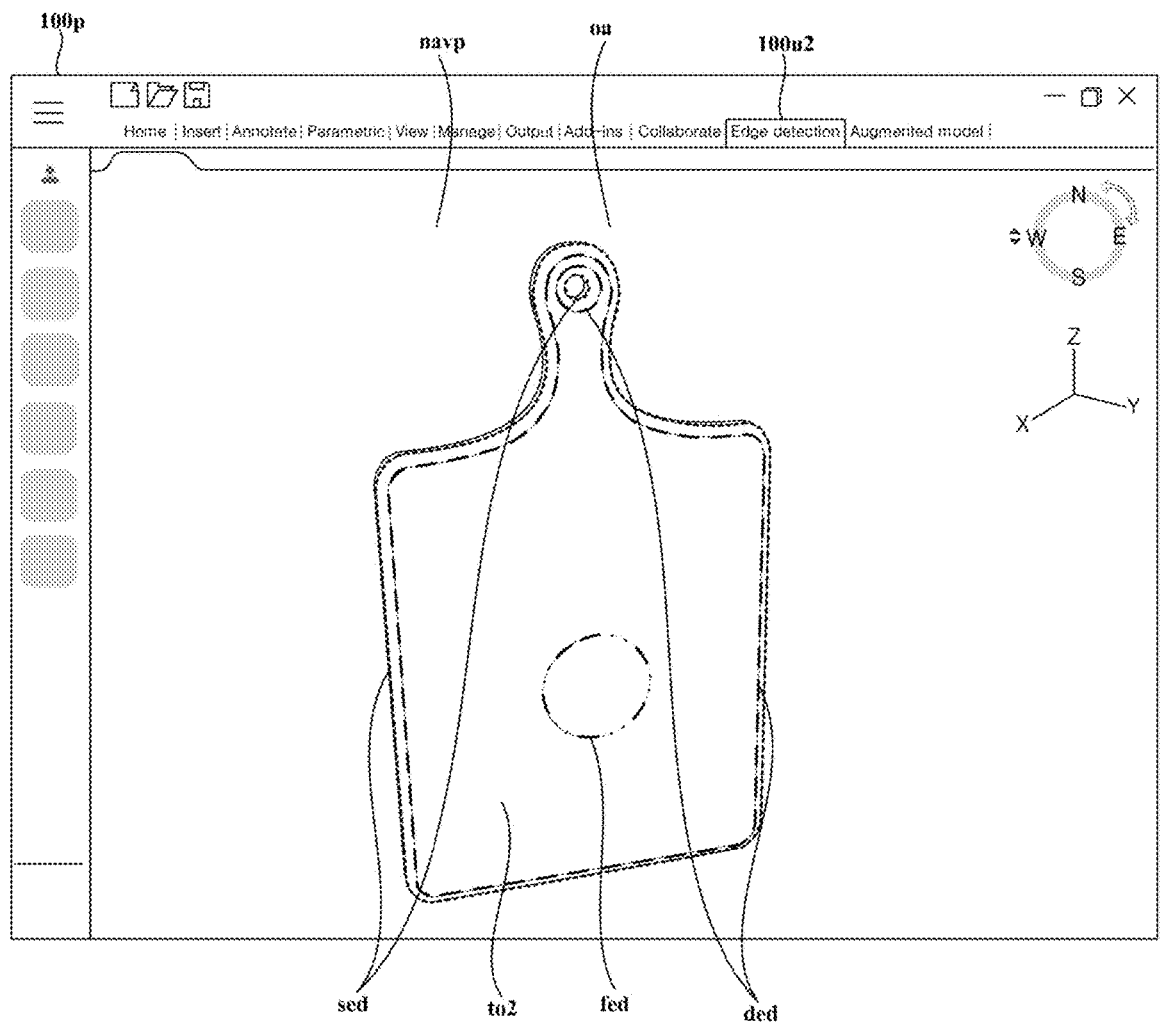

As exemplarily shown in FIG. 6, the computer-aided design program 100*p* may provide an edge detection interface 100*u*2. In various embodiments, the edge detection interface 100*u*2 may be integrated into a single interface with the target object modeling interface 100*u*1. In various embodiments, the edge detection interface 100*u*2 may be executed according to the selection of a specific affordance on the target object modeling interface 100*u*1 and displayed overlapping with the target object modeling interface 100*u*1. In addition, the edge detection interface 100*u*2 may provide tools for detecting an edge of a target object, setting a sample point, correcting the detected edge, and editing the edge.

Figure 12:
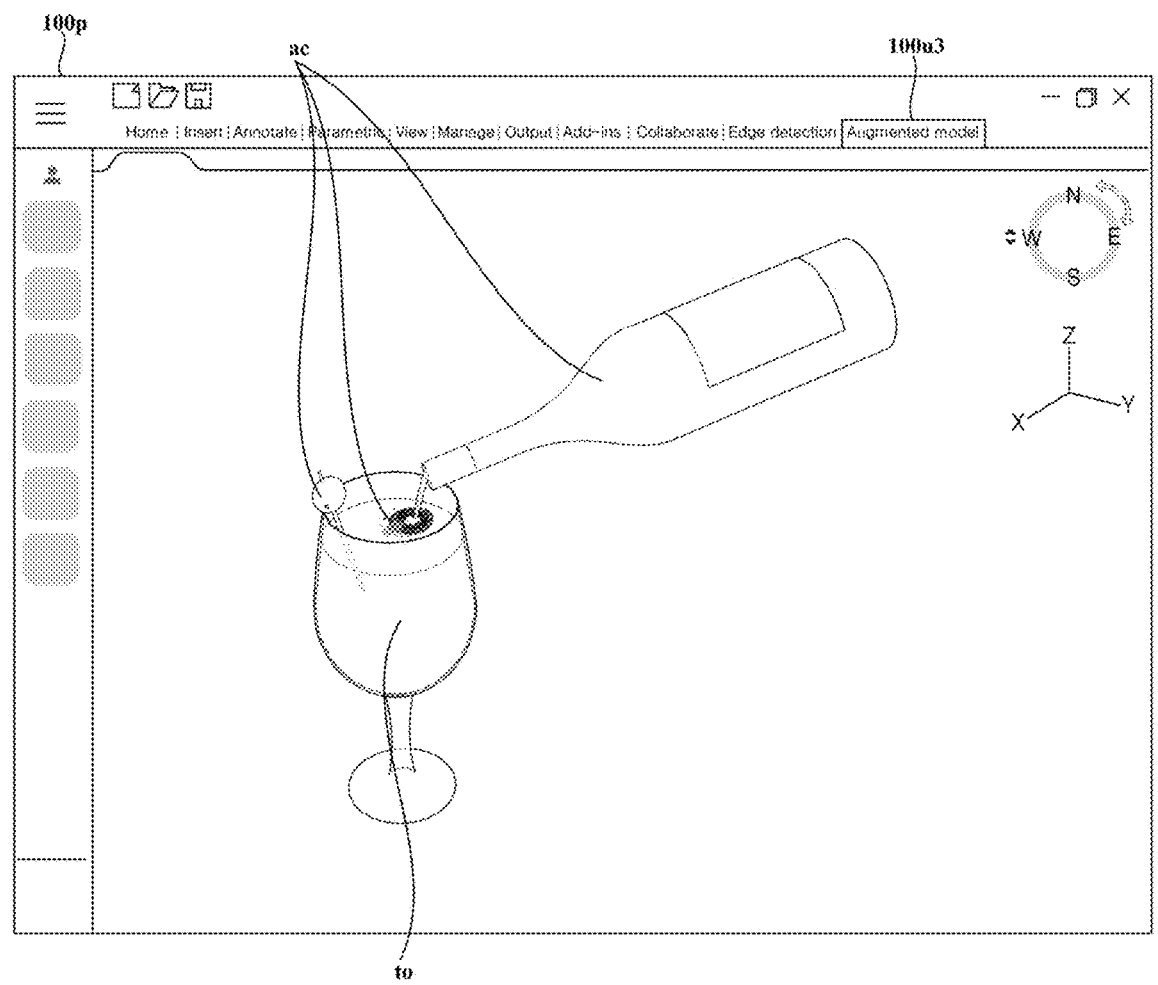

As exemplarily shown in FIG. 12, the computer-aided design program 100*p* may provide an augmented model implementation interface 100*u*3 to provide various tools for drawing an augmented model. In various embodiments, the augmented model implementation interface 100*u*3 may be an interface integrated into a single interface with the target object modeling interface 100*u*1.

(Method of Learning a Target Object)

Referring to FIG. 4, a method S100 of learning a target object by detecting edge characteristics from a digital model of a target object and setting a sample point according to one embodiment of the present disclosure, may include: displaying the digital model of the target object that is a target of image recognition (S101), detecting edges in the digital model (S103), displaying the edges classified by characteristics (S105), generating sample point information (S107), generating object recognition library data (S109), matching the digital model and augmented content (S111), and transmitting object recognition library data (S113).

Hereinafter, each step will be described in detail with reference to the drawings.

(Displaying of a Digital Model of a Target Object that is a Target of Image Recognition (S101))

As shown in FIG. 5, the computer-aided design program 100*p* may display a digital model to of the target object. The displayed digital model of the target object may be created through the target object modeling interface 100*u*1 as a 3D model, for example. In some embodiments, the computer-aided design program 100*p* may load and display a pre-stored digital model to of the target object. According to some embodiments, the digital model to of the target object may be created on a different type of computer-aided design program. In addition, the computer-aided design program 100*p* may import and display a digital model to or a 2D image of the target object created on the different type of computer-aided design program.

(Detecting of Edges in the Digital Model (S103), and Displaying of the Edges Classified by Characteristics (S105))

The computer-aided design program 100p may detect edge information on the digital model to based on attribute information of the digital model to. The attribute information of the digital model to may include coordinate information of each element constituting the digital model to. The element may mean including at least one of a point, a line, and a face constituting the digital model to.

In various embodiments, the attribute information of the digital model to may include color information of each element constituting the digital model to.

Various edge detection algorithms may be applied to detect edge information of the digital model to. For example, the computer-aided design program 100p may detect an edge based on angle information between normal vectors of faces including an arbitrary point constituting the outline of the digital model to, but the present disclosure is not limited thereto.

The computer-aided design program 100p may classify the detected edges according to characteristics.

The detected edges may be classified into a sharp edge, a dull edge, and a flat edge.

Among the edges detected in the digital model to, when an angle between normal vectors of faces forming one of the edges has a first angle range (a1 to a2), the corresponding edge may be classified as the sharp edge, and when an angle between normal vectors of faces forming another one of the edges has a second angle range (b1 to b2, b2<a1) having a maximum angle smaller than the minimum angle within the first angle range (a1 to a2), the corresponding edge may be classified as the dull edge. In some embodiments, it is determined that an edge having a third angle range (c1 to c2, c2<b1) in which an angle smaller than the minimum angle b1 in the second angle range (b1 to b2) is the maximum angle, does not generate a visible feature, and the corresponding edge may be determined to be a non-edge. An angle formed by normal vectors of faces forming the edge having the third angle range may have an angle substantially close to 0.

In addition, since no edge exists on a flat face of the digital model to, no edge will be detected on the corresponding flat face. However, assuming that a line is drawn on the flat face, the computer-aided design program 100p may detect the line on the flat face as an edge and classify it as the flat edge. That is, when the angle between the normal vector of the face including at least some points of a line and the components of the digital model to adjacent thereto and the normal vector of the face constituting the components of the digital model to around the line is 0 degrees, the corresponding line may be classified as the flat edge.

In various embodiments, based on calculated value of an inner product between the normal vectors of a visualized faces in the digital model to at a specific location and an inner product between the normal vectors of other faces that is not displayed on a screen depending on the view on the computer-aided design program 100p but is connected to the visualized faces, the computer-aided design program 100p may detect dull edges by quickly and efficiently determining whether the corresponding surfaces form dull edges that are not sharp or flat.

Referring to FIG. 6, the computer-aided design program 100p may classify edges ed detected on a first digital model to1 according to characteristics and display edges sed and ded to be visually distinguished. In some embodiments, the computer-aided design program 100p may display an edge ed overlapping the first digital model to1.

It can be seen that on the first digital model to1 as a wine cup exemplarily illustrated in FIG. 6, sharp edges sed and dull edges ded are displayed, and no flat edge exists. In addition, on a second digital model to2 as a cutting board exemplarily illustrated in FIG. 7, sharp edges sed and dull edges ded are displayed, and a flat edge fed is displayed.

According to various embodiments, assuming that the first digital model to1 as the wine cup exemplarily illustrated in FIG. 6 is rotated about a reference line rl (shown for convenience of description), the dull edge ded becomes the entire area of the cup portion and the handle portion of the wine cup. Accordingly, since the dull edge ded is dependent on the view on the computer-aided design program 100p, the dull edge ded may be updated in real time during the position change of the digital model to and displayed in the edge area on the first digital model to1.

Figure 8:
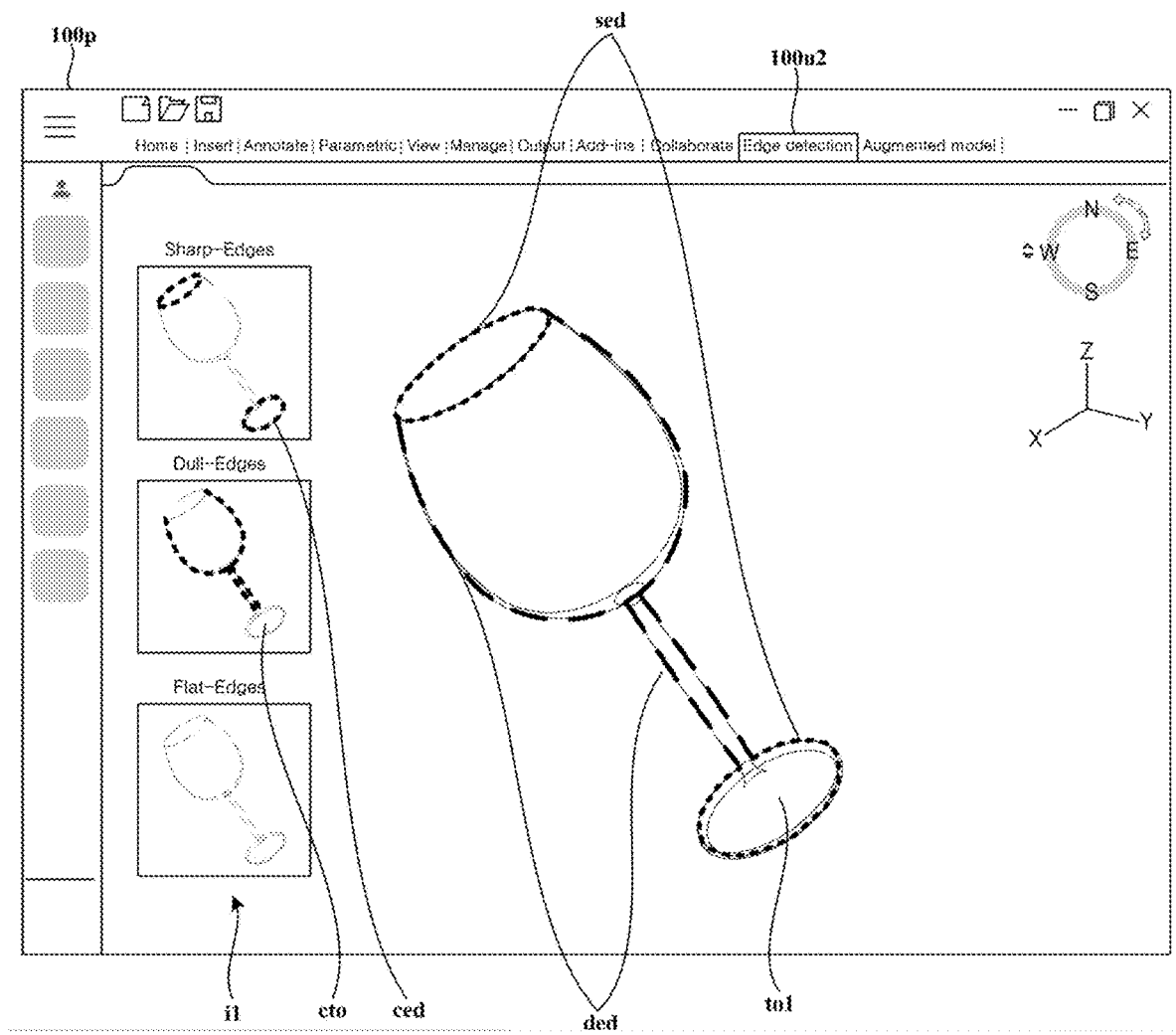

Referring to FIG. 8, in various embodiments, the computer-aided design program 100p may physically decompose and visualize the edges by characteristics on the first digital model to1 through an individual edge setting interface i1.

Through the individual edge setting interface i1, the computer aided design program 100p may extract only sharp edges to display the sharp edges overlapping with the first digital model to1, extract only dull edges to display the dull edges overlapping with the first digital model to1, and extract only flat edges to display the flat edges overlapping with the first digital model to1.

In various embodiments, duplicate digital models cto and duplicate edges ced displayed on the individual edge setting interface i1 may be synchronized with the positions of the first digital model to1 and the edges ed displayed on the edge detection interface 100u2. Accordingly, the positions of the duplicated digital model cto and the duplicated edges ced may be changed in synchronization with the change in the position of the first digital model to1 and the edges ed, respectively.

Figure 9:
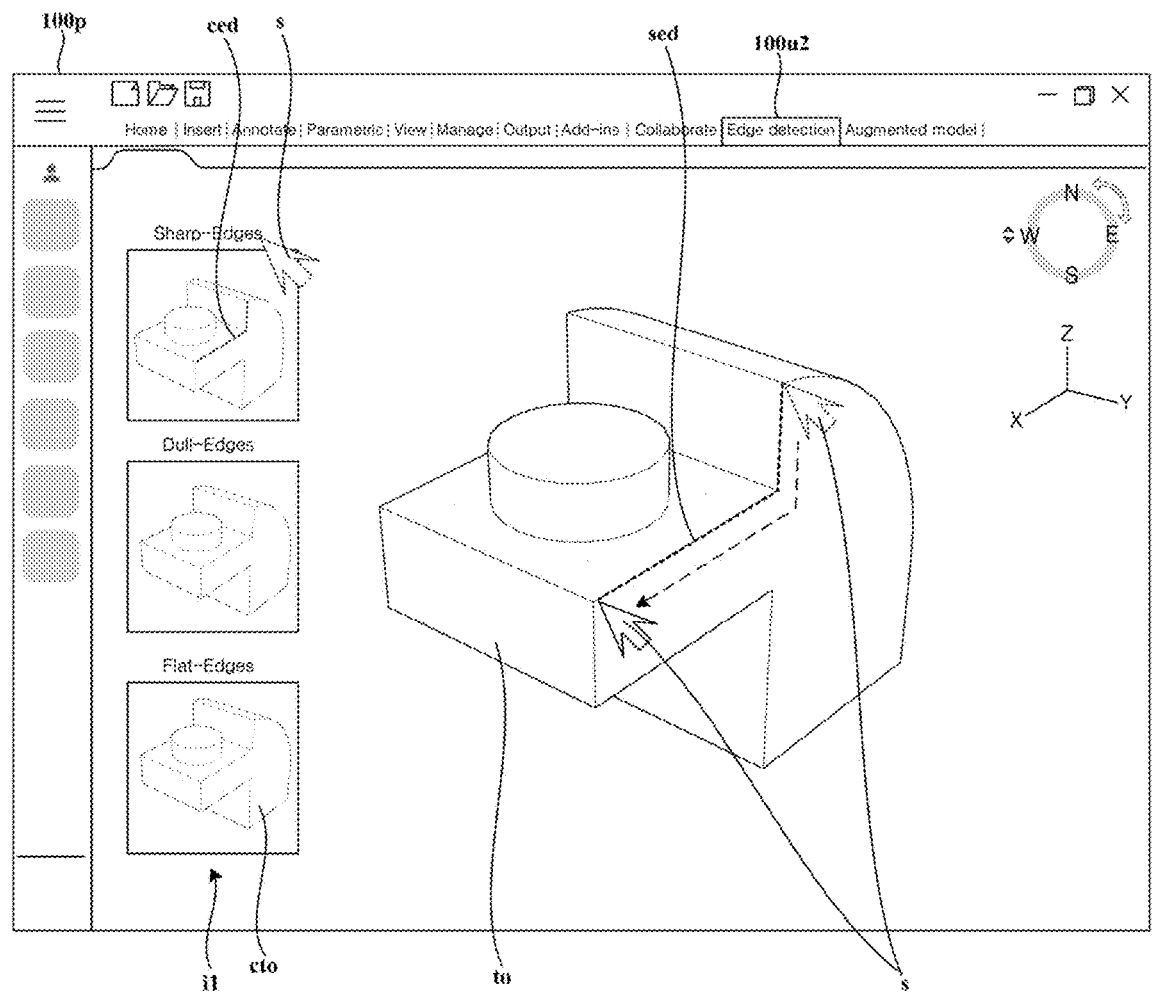

Referring to FIG. 9, in various embodiments, the computer-aided design program 100p may provide an environment in which an edge can be set in at least a partial area on the digital model to or a displayed edge can be edited. For example, the computer-aided design program 100p may display an edge ed connecting selected points to each other in response to selection of a plurality of points on the digital model to. In addition, the computer-aided design program 100p may display an edge connecting a plurality of points selected on the digital model to in response to selection of any one of the sharp edge, the dull edge, and the flat edge on the individual edge setting interface i1 (according to the illustrated example, the selected sharp edge is displayed on the digital model).

In various embodiments, it is assumed that a design of a partial area is changed according to a design change of the digital model to. For example, assuming that a line existing on a flat face of the digital model to is removed, the computer-aided design program 100p may remove the specific line and the flat edge displayed on the corresponding line of the digital model to together in response to receiving a line removal request signal.

In addition, when the computer-aided design program 100p imports and displays a digital model to composed of a different type of extension, since the design of a partial area of the digital model to may be modified due to compatibility problems between programs, and the like, a partial modification of the digital model to by the user is required. In this case, when the user changes the design of a partial area of the digital model to, the edge ed is automatically detected and displayed in the modified part of the digital model to, and the edge ed on the digital model to may be updated in real time, and in some cases, the user may directly add an edge ed or edit the edge ed.

Figure 10:
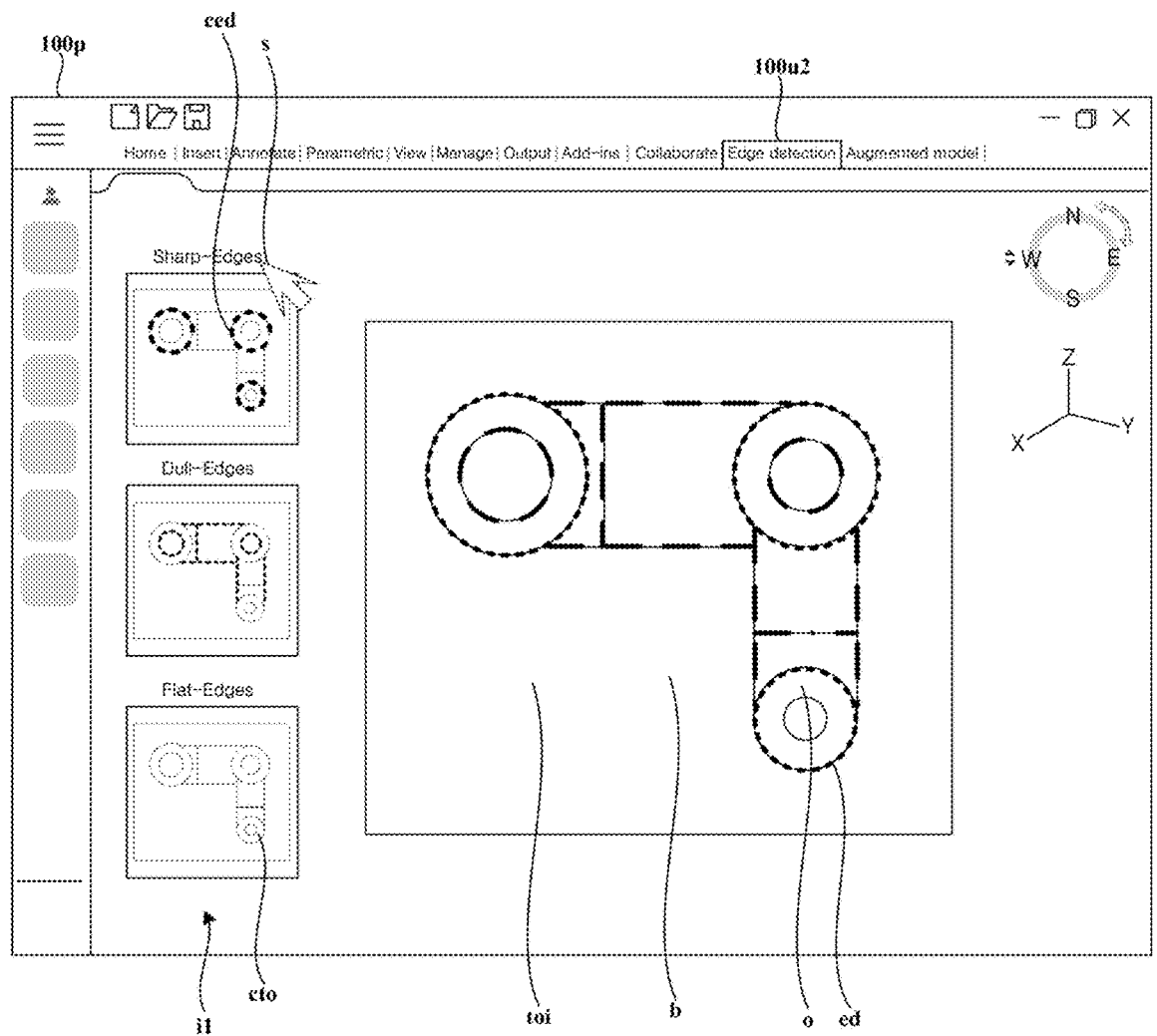

In addition, when a 2D image is treated as a digital model toi as exemplarily shown in FIG. 10, it is necessary to take into account the imprecision of the displayed edge ed on the digital model toi caused by factors such as the unclear distinction according to the matching of the contrast and gray level values between a background b and an object o in the 2D image, and 2D coordinate information including no meaning of z-axis information. In this case, the user directly adds or edits the edge ed so that robust feature information of the object o on the 2D image can be detected. Accordingly, precise tracking and a highly accurate recognition rate of the object o in the digital model toi of the 2D image can be guaranteed even when the object o on the 2D image is located on real environments with various backgrounds.

(Generating of Sample Point Information (S107))

The computer-aided design program 100p may generate sample point information by detecting a sample point, which is a feature point, from the detected edge of the digital model to.

Various algorithms for detecting sample points from edges may be applied.

In some embodiments, the computer-aided design program 100p may detect a midpoint of each edge, detect a sample point in one direction along the corresponding edge from the detected midpoint, and detect a sample point in the other direction along the corresponding edge. This is more advantageous in ensuring uniformity of distribution of sample points at each edge compared to detecting the sample point from the vertex of the edge. In addition, in the embodiments, it is possible to solve the runtime-intensive problem during data learning compared to a method of rendering a digital model and determining and retrieving a silhouette through erosion or a method of retrieving a sample point on a rendered image by checking a strong gradient. Further, sample points can be detected more easily especially in a digital model having a unique internal structure.

In some embodiments, the computer-aided design program 100p may display sample points detected for each edge. In some embodiments, the computer-aided design program 100p may display sample points generated by overlapping with the digital model to. In some embodiments, a graphics processing unit (GPU) of the authoring computing device 100 may be used to perform visibility of sample points for each position of the digital model to and discarding of all obscured sample points in real time.

(Generating of Object Recognition Library Data (S109))

The computer-aided design program 100p may generate object recognition library data based on detected edge information and sample point information on the detected edge.

In some embodiments, the object recognition library data may include at least one of position information of a digital model to of a target object, positions of edges on the digital model to of the target object, a relative position among the edges, characteristics of the edges, a position of a sample point, and relative positional relationship information.

In various embodiments, the computer-aided design program 100p may obtain edge information detected from the digital model to through a pre-learned deep learning neural network and information of a sample point on the detected edge to detect robust feature information of the digital model to of the target object.

In various embodiments, the computer-aided design program 100p may group sample points of edges of the same characteristic and learn each of the grouped data through a deep learning network to obtain robust feature information of the digital model to of the target object.

In various embodiments, the computer-aided design program 100p may provide an environment for testing the robustness of detected sample points.

Figure 11:
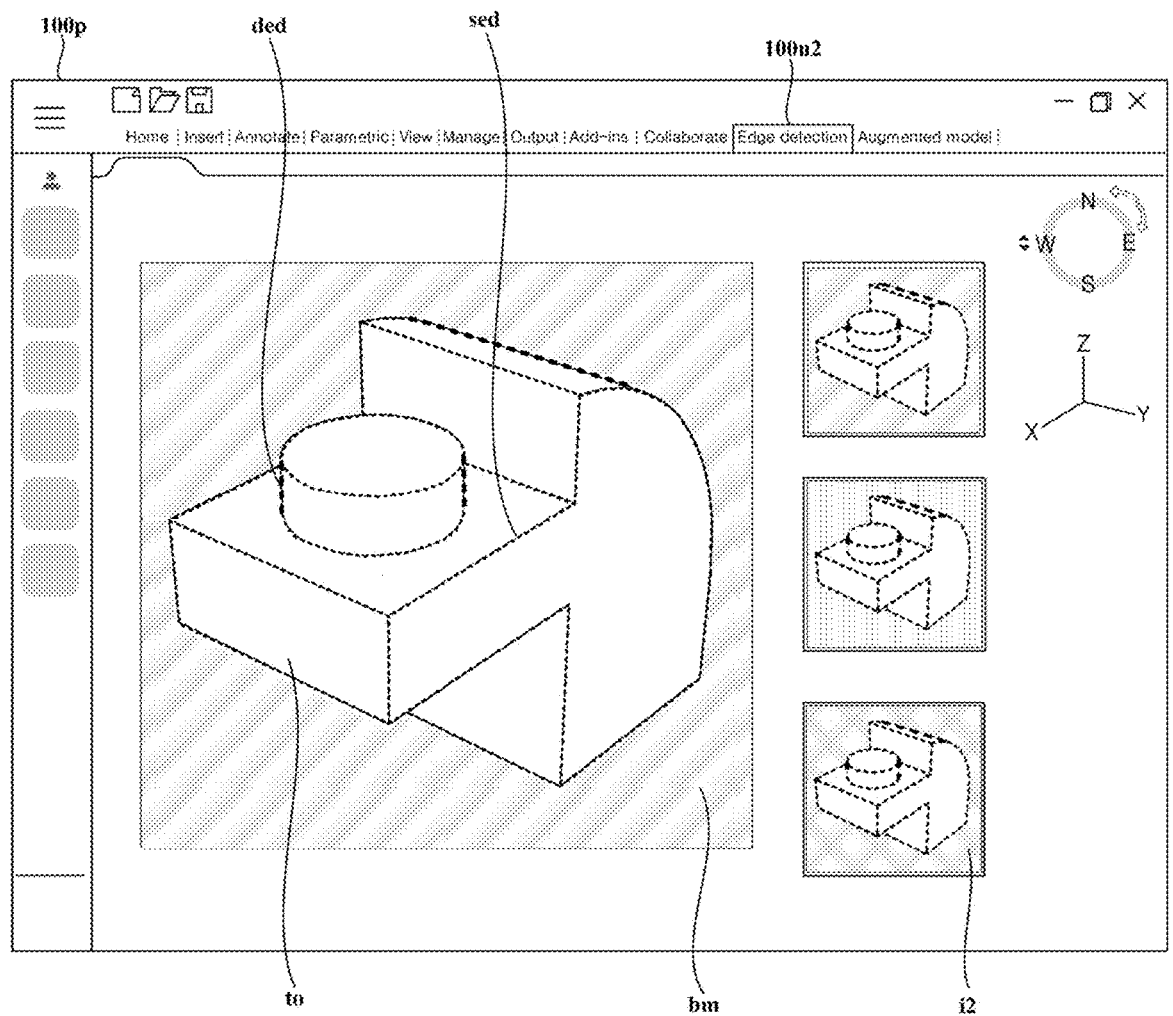

Referring to FIG. 11, the computer-aided design program 100p may display a digital model to of a target object and a background model bm serving as a background of the digital model to of the target object.

The computer-aided design program 100p may generate image data taken in the current view for the background model bm and the digital model to visually displayed.

In addition, the computer-aided design program 100p may move and/or rotate the digital model to to change the pose of the digital model to while maintaining the background model bm. Further, the computer-aided design program 100p may generate image data captured in the current view (view currently displayed on the screen) for the displayed background model bm and the digital model to whose pose has been changed.

In some embodiments, the computer-aided design program 100p may change the background model bm while maintaining the current pose of the digital model to. In addition, the computer-aided design program 100p may generate image data captured in the current view for the displayed background model bm and digital model to. Accordingly, it is possible to generate captured image data for the digital model to located on various backgrounds.

In some embodiments, the computer-aided design program 100p may provide an interface i2 for visualizing image data generated by photographing the background model bm and the digital model to depending on the change of the background model bm or the pose of the digital model to.

The computer-aided design program 100p may evaluate the accuracy of tracking and recognizing an object corresponding to the digital model to in each of the captured image data based on the generated object recognition library data. In addition, the computer-aided design program 100p may re-search sample points on the digital model to when it is determined that the accuracy of recognition is equal to or less than a preset reference value. In this case, for example, the computer-aided design program 100p may detect sample points on the edge by applying another algorithm that has not been applied among a plurality of sample point detection algorithms, or re-detect the sample points by changing parameter conditions in the same sample point detection algorithm, but the present disclosure is not limited thereto. The computer-aided design program 100p may generate object recognition library data having robust characteristics in tracking and recognizing real objects located on various real backgrounds while repeating the above processes.

In various embodiments, the computer-aided design program 100p may generate object recognition library data in which robustness of tracking and recognition of a real object embodying the digital model to is secured by detecting sample points, or edges and sample points from the digital model to with no background (e.g., FIG. 5 or 6), detecting sample points, or edges and sample points from digital models to located on various digital background models bm and learning the sample points of the digital model to through the deep learning network.

(Matching of Digital Model and Augmented Content (S111))

Referring to FIG. 12, the computer-aided design program 100p may provide various tools for creating augmented content ac to be matched with a digital model to of a target object. In various embodiments, the computer-aided design program 100p may call and display pre-stored augmented content ac. According to some embodiments, the augmented content ac may be created on a different type of computer-aided design program. Then, the computer-aided design program 100p may import and display the augmented content ac created on the different type of computer-aided design program.

The computer-aided design program 100p provides an interface for moving, rotating, enlarging, and reducing the displayed augmented content ac in x, y, and z axes to enable sufficient and detailed matching of the augmented content ac and the digital model to of the target object. It should be noted that the concept of the matching includes not only the physical contact between the augmented content ac and the digital model to of the target object, but also the setting of a distance of the augmented content ac from the digital model to of the target object, and the setting of a display position of the augmented content ac with respect to the digital model to of the target object. In addition, the computer-aided design program 100p may provide a tool for imparting dynamic properties to the augmented content ac to perform simulation while changing the location and/or shape of the augmented content ac in time series. Further, the computer-aided design program 100p may provide an interface for adding various types of information as well as an augmented model.

(Transmitting of Object Recognition Library Data (S113))

The authoring computing device 100 may transmit object recognition library data to an external device in response to a transmission request of the external device. The external device may be the user computing device 200, but is not limited thereto.

The user computing device 200 may receive object recognition library data from, for example, the authoring computing device 100 that stores the object recognition library data.

Referring back to FIGS. 2 and 3, the user computing device 200 may track the real object 30 corresponding to the digital model to of the target object from the objects on the real environment 20 being photographed. The user computing device 200 may detect the real object 30 in the captured image based on the characteristic information of the edges ed detected on the digital model to of the target object and the sample points of each edge ed. The user computing device 200 may extract feature information as the sample point from the image captured while tracking the real object by applying an edge detection and sample point extraction algorithm, and recognize the real object 30 by comparing the extracted feature information with object recognition library data.

In various embodiments, the user computing device 200 may detect and track the pose of the real object 30 based on all dull edges among the edges ed detected in the captured image. The user computing device 200 can detect and track the pose of the real object 30 very efficiently since it determines the dull edge by checking the difference in signs by the inner product of the normal vectors of the various faces constituting the real object 30. In addition, the user computing device 200 can accurately detect and track the real object 30 by utilizing sample point information of edges on the object recognition library data.

When the user computing device 200 recognizes the real object 30, the user computing device 200 may call the augmented content ac stored in the database or the authoring computing device 100, or other server, and render and augment the augmented content ac in matching with the real object 30 to adjust event flags to trigger stored interaction events.

Depending on the angle and observation distance at which a camera of the user computing device 200 observes the real object 30, the augmented virtual model or other virtual information may be observed in various aspects and different sizes. In various embodiments, the user computing device 200 may display various information related to the real object 30.

In various embodiments, a user may manipulate augmented content ac displayed on the user computing device 200 through manipulation of the user computing device 200.

In various embodiments, the user computing device 200 provides an interface through which the user can move, rotate, enlarge, and reduce the displayed augmented content ac in x, y, and z axes, for sufficient and detailed observations about the augmented content ac. In addition, the user computing device 200 provides richer information than static information by allowing various kinds of information to be added as well as the augmented model. Further, the user computing device 200 may check before and after construction of a new part displayed as an augmented model in an existing device, augment a virtual structure in a part that is difficult to check with the naked eye, or may perform simulation of an augmented model that sequentially changes according to time as a 4D concept in which a time dimension is added to the 3D of x, y, and z axes. In various embodiments, the user computing device 200 may provide an interaction function, and in some embodiments, an additional controller may be used to implement the interaction.

The embodiments according to the present disclosure described above may be implemented in the form of program instructions that can be executed through various computer components and recorded on a computer-readable recording medium. The computer-readable recording medium may include program instructions, data files, data structures, etc. alone or in combination. The program instructions recorded on the computer-readable recording medium may be specially designed and configured for the present disclosure, or may be known and available to those skilled in the art of computer software. Examples of the computer-readable recording medium include a magnetic medium such as a hard disk, a floppy disk and a magnetic tape, an optical recording medium such as CD-ROM and DVD, a magneto-optical medium such as a floptical disk, and hardware devices specially configured to store and execute program instructions, such as ROM, RAM, flash memory, and the like. Examples of the program instructions include high-level language codes that can be executed by a computer using an interpreter or the like as well as machine language codes generated by a compiler. the hardware device may be modified to one or more software modules to perform processing according to the present disclosure, and vice versa.

Specific implementations described in the present disclosure are examples, and do not limit the scope of the present disclosure in any way. For brevity of the specification, description of conventional electronic components, control systems, software, and other functional aspects of the systems may be omitted. In addition, the connection of lines or connecting members between the components shown in the drawings represent functional connections and/or physical or circuit connections by way of example, and in actual devices, various functional connections, physical connections, or circuit connections, which are replaceable or additional. Further, if there is no specific reference such as "essential" or "important", it may not be a component necessarily required for the application of the present disclosure.

In addition, the detailed description of the present disclosure described has been described with reference to preferred embodiments of the present disclosure, it will be understood by those skilled in the art or those having ordinary knowledge in the art that the present disclosure may be variously modified and changed without departing from the spirit and the technical scope of the present disclosure described in the claims to be described later. Therefore, the technical scope of the present disclosure is not limited to the contents described in the detailed description of the specification, but should be defined by the claims.

What is claimed is:

1. A method of learning a target object by detecting an edge from a digital model of the target object and setting a sample point, which is performed by a computer-aided design program of an authoring computing device, the method comprising:
displaying the digital model of the target object that is a target of image recognition
detecting edges on the digital model of the target object;
classifying the detected edges according to a plurality of characteristics;
obtaining sample point information on the detected edges; and
generating object recognition library data for recognizing a real object implementing the digital model of the target object based on the detected edges, characteristic information of the detected edges, and the sample point information,
wherein the obtaining of the sample point information on the detected edges includes detecting a midpoint of each of the detected edges, and detecting sample points along the edges from the midpoints.

2. The method of claim 1, wherein the classifying of the detected edges according to the plurality of characteristics includes:
classifying the detected edges into a sharp edge, a dull edge, and a flat edge based on information on angles formed by normal vectors of faces including components of the digital model of the target object.

3. The method of claim 2, wherein an angle between the normal vectors of the faces forming the sharp edge has a first angle range,
an angle between the normal vectors of the faces forming the dull edge has a second angle range having a maximum angle smaller than a minimum angle within the first angular range,
an angle between the normal vectors of the faces forming the flat edge has a third angle range having a maximum angle smaller than a minimum angle within the second angle range.

4. The method of claim 1, further comprising:
classifying and visualizing the detected edges according to characteristics by superimposing the detected edges on the digital model of the target object,
wherein the classifying and visualizing of the detected edges according to characteristics includes updating visualization of the detected edges on the digital model of the target object in response to a change of a position of the digital model of the target object.

5. The method of claim 4, wherein the classifying and visualizing of the detected edges according to characteristics includes, in synchronization with a design change of a partial area of the digital model of the target object, modifying and displaying an edge on the design-changed area.

6. The method of claim 1, further comprising:
generating augmented content, matching and storing the augmented content with the digital model of the target object.

7. A method of augmenting a virtual model to a real object implementing a target object learned by detecting edge characteristics and setting sample points, which is performed by an augmented reality program of a terminal including a camera, the method comprising:
displaying a digital model of the implemented target object that is a target of image recognition
detecting edges on the digital model of the target object;
classifying the detected edges according to a plurality of characteristics;
obtaining sample point information on the detected edges; and
generating object recognition library data for recognizing a real object implementing the digital model of the target object based on the detected edges, characteristic information of the detected edges, and the sample point information
receiving and storing the object recognition library data;
capturing an image by photographing surrounding environment;
detecting a real object that is matched with the stored object recognition library data in the captured image; and
matching and displaying augmented content to the detected real object,
wherein the obtaining of the sample point information on the detected edges includes detecting a midpoint of each of the detected edges, and detecting sample points along the edges from the midpoints.

8. The method of claim 7, wherein the detecting of a real object matched with the stored object recognition library data in the captured image includes detecting a real object in the captured image based on characteristic information of edges detected on a digital model of the target object and a sample point of each edge.

9. The method of claim 7, further comprising:
detecting and tracking a pose of the real object by detecting a dull edge of the real object in the captured image.

* * * * *